(12) United States Patent
Perkins et al.

(10) Patent No.: US 6,718,644 B1
(45) Date of Patent: Apr. 13, 2004

(54) SYSTEM FOR ALIGNING A HUB/MAST WITH A SOFFIT PENETRATION POINT AND METHOD OF USING SAME

(76) Inventors: Timothy Perkins, 2302 Winona Dr., Panama City, FL (US) 32405; John C. Parker, 6030 John Pitts Rd., Panama City, FL (US) 32404-5110

( * ) Notice: Subject to any disclaimer, the term of this patent is extended or adjusted under 35 U.S.C. 154(b) by 0 days.

(21) Appl. No.: 10/197,603

(22) Filed: Jul. 18, 2002

(51) Int. Cl.[7] .............................................. G01C 15/02
(52) U.S. Cl. ............................ 33/286; 33/227; 33/263; 33/275 R; 33/DIG. 21
(58) Field of Search ........................ 33/281, 282, 285, 33/286, 290, 291, DIG. 21, 227, 228, 354, 263, 275 R

(56) References Cited

U.S. PATENT DOCUMENTS

| | | | | |
|---|---|---|---|---|
| 2,407,845 A | * | 9/1946 | Nemeyer .................... 33/286 |
| 3,884,593 A | * | 5/1975 | Christoffer .................. 33/334 |
| 3,982,839 A | | 9/1976 | Schwartz ..................... 356/250 |
| 4,160,285 A | * | 7/1979 | Shibla ........................ 362/145 |
| 4,333,242 A | | 6/1982 | Genho, Sr. .................. 33/227 |
| 4,448,528 A | | 5/1984 | McManus .................... 356/250 |
| 4,474,513 A | * | 10/1984 | Salyers ....................... 408/110 |
| 4,679,937 A | | 7/1987 | Cain et al. .................. 356/138 |
| 4,852,265 A | | 8/1989 | Rando et al. ................ 33/227 |
| 4,854,704 A | | 8/1989 | Funazaki et al. ........... 356/250 |
| 4,912,851 A | | 4/1990 | Rando et al. ................ 33/227 |
| 5,108,177 A | | 4/1992 | Middleton .................. 356/250 |
| 5,144,487 A | | 9/1992 | Hersey ....................... 359/629 |
| 5,212,889 A | | 5/1993 | Lysen ......................... 33/286 |
| 5,367,779 A | * | 11/1994 | Lee ............................. 33/290 |
| 5,448,834 A | * | 9/1995 | Huang .................... 33/DIG. 21 |
| 5,541,727 A | | 7/1996 | Rando et al. ................ 356/149 |
| 5,568,265 A | * | 10/1996 | Matthews .................... 33/286 |
| 5,572,797 A | | 11/1996 | Chase ......................... 33/286 |
| 5,704,804 A | * | 1/1998 | Robinson et al. ........... 439/517 |
| 5,754,287 A | | 5/1998 | Clarke ........................ 356/250 |
| 5,784,792 A | * | 7/1998 | Smith ......................... 33/227 |
| 5,917,587 A | | 6/1999 | Rando ........................ 356/149 |
| 6,009,630 A | | 1/2000 | Rando ........................ 33/365 |
| 6,012,229 A | * | 1/2000 | Shiao ......................... 33/281 |
| 6,028,665 A | | 2/2000 | McQueen .................... 356/250 |
| 6,286,219 B1 | * | 9/2001 | Palumbo, II ................ 33/286 |
| 6,301,997 B1 | * | 10/2001 | Welte ......................... 33/286 |
| 6,371,626 B1 | * | 4/2002 | Addona ................... 33/DIG. 21 |
| 6,374,507 B1 | * | 4/2002 | Lehto ......................... 33/286 |
| 6,393,708 B1 | * | 5/2002 | Culver et al. ............... 33/286 |
| 6,493,955 B1 | * | 12/2002 | Moretti ...................... 33/286 |
| 6,520,798 B1 | * | 2/2003 | Robinson et al. ........... 439/517 |

* cited by examiner

Primary Examiner—Diego Gutierrez
Assistant Examiner—Madeline Gonzalez

(57) ABSTRACT

A system for aligning a hub/mast with a soffit penetration point uses an insert that is similar in shape to a terminal adapter that is threadably received within a hub of a meter base. An opening within the insert receives a laser such that when the insert is received within the terminal adapter, the laser beam emitted by the laser, corresponding to the longitudinal axis of the terminal adapter, illuminates the proper penetration point on the soffit of a building from which an electrical conduit holding an electrical conductor should extend.

8 Claims, 3 Drawing Sheets

SYSTEM FOR ALIGNING A HUB/MAST WITH A SOFFIT PENETRATION POINT AND METHOD OF USING SAME

BACKGROUND OF THE INVENTION

1. Field of the Invention

The present invention relates to a device that aligns a mast from a hub of a meter base with the penetration point within the soffit of the building to which the meter base is attached.

2. Background of the Prior Art

In a typical electrical configuration of a building, an electrical supply, usually supplied by a municipality or private electrical suppliers is brought to a meter base via an electrical conductor (usually aluminum or copper wire) wherein a meter for detecting electrical usage by the occupants of the building can be measured and charged accordingly. The electrical conductor is brought to the building and then dropped down through a penetration point in the soffit and into the meter base through a mast that is threadably attached to the meter base's hub. After passing through the meter within the meter base, the electrical supply is brought into the building wherein the electrical supply is used as appropriate. This configuration is simple in design and is very efficient.

The problem with this configuration lies not in the configuration itself, but in the installation process during building construction. In a typical building, the distance between the hub via the mast and the penetration point within the soffit can range anywhere from 6 feet to 20 feet or more. As many single family homes utilize but one electrician for installation of the various electrical systems, the appropriate vertical alignment of the hub/mast with the penetration point in the soffit can prove quite difficult. Although the electrician may attempt to eyeball the alignment, any mistake in alignment judgment will result in the conduit within which the conductor runs, to be askew from the vertical and will be unsightly and may be unacceptable to the building owner.

In order to overcome the problem with vertically aligning the hub/mast with the penetration point within the soffit, the electrician simply employs a second person who positions himself at the soffit proximate the penetration point and hangs a plumb bob in order to properly align the hub/mast with the penetration point within the soffit. Once correctly aligned, a mark is made on the soffit and thereafter a penetration hole is produced. While this method may provide a relatively accurate vertical alignment, it requires the use of a second person whose sole function is to help in the alignment. If this second person lacks further responsibility on the particular job, that person's use for the alignment process may prove to be economically quite inefficient. Additionally, if a strong wind is present during the alignment attempt, then it may prove difficult, if not impossible to achieve a proper vertical alignment of the hub/mast with the penetration point within the soffit. In such a case, the alignment process is delayed until the wind dies down to a manageable level, further adding to the economic inefficiencies of the alignment process.

Therefore, there exists a need in the art for a system that allows a single electrician to vertically align a hub of a meter base that receives a mast with the penetration point within the soffit of the building to which the meter base is attached. Such a system must allow the electrician to act alone and must be utilizable even in high wind conditions. Ideally, such a system will be of relatively simple design and construction and will be easy to use and maintain.

SUMMARY OF THE INVENTION

The system for aligning a hub/mast with a soffit penetration point and method for using same of the present invention addresses the aforementioned needs in the art. Specifically, the present invention provides a system that allows a single electrician to vertically align a hub of a meter base with the penetration point within the soffit of the building to which the meter base is attached. The system allows the electrician to act alone and is utilizable in all weather conditions including high wind conditions. The system for aligning a hub/mast with a soffit penetration point and method of using same of the present invention is of relatively simple design and construction and is easy to use and maintain.

The system for aligning a hub/mast with a soffit penetration point and method of using same of the present invention is comprised of an insert having an upper section that has a top surface and a first diameter and a lower section that has a bottom surface and a second diameter, the first diameter of the upper section being greater than the second diameter of the lower section. An opening extends into the insert from the top surface along a longitudinal axis of the insert. A laser emitting device is receivable within the opening such that a beam emitted by the laser emitting device extends upwardly from the top surface along the longitudinal axis of the insert. The insert is received within a terminal adapter that is threadably attached to a hub of a meter base which is attached to a building. The laser emitting device, held within the opening of the insert, emits a laser beam that illuminates a proper penetration point on a soffit of the building. The opening within the insert may extend between the top surface and the bottom surface of the insert. The terminal adapter has a top section that has a third diameter and a bottom section that has a fourth diameter that is smaller than the third diameter. The bottom section of the terminal adapter is threadably attached to the hub and the lower section of the insert is received within the bottom section of the terminal adapter and the upper section of the insert is received within the top section of the terminal adapter.

BRIEF DESCRIPTION OF THE DRAWINGS

Similar reference numerals refer to similar parts throughout the several views of the drawings.

DESCRIPTION OF THE PREFERRED EMBODIMENT

Figure 1:
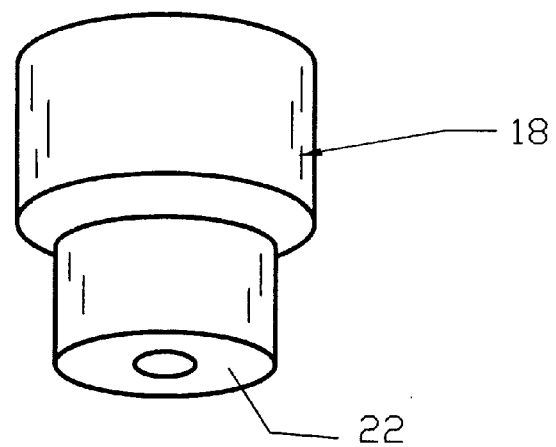
FIG. 1 is a perspective view of the system for aligning a hub/mast with a soffit penetration point of the present invention.
Figure 2:
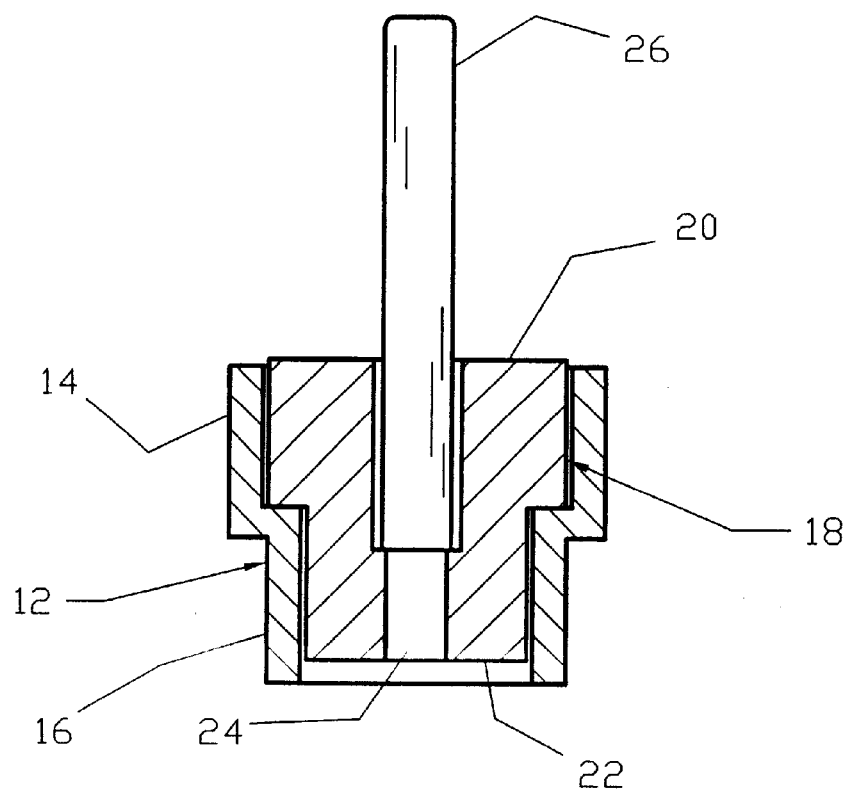
FIG. 2 is a side sectioned view of the system for aligning a hub/mast with a soffit penetration point.
Figure 3:
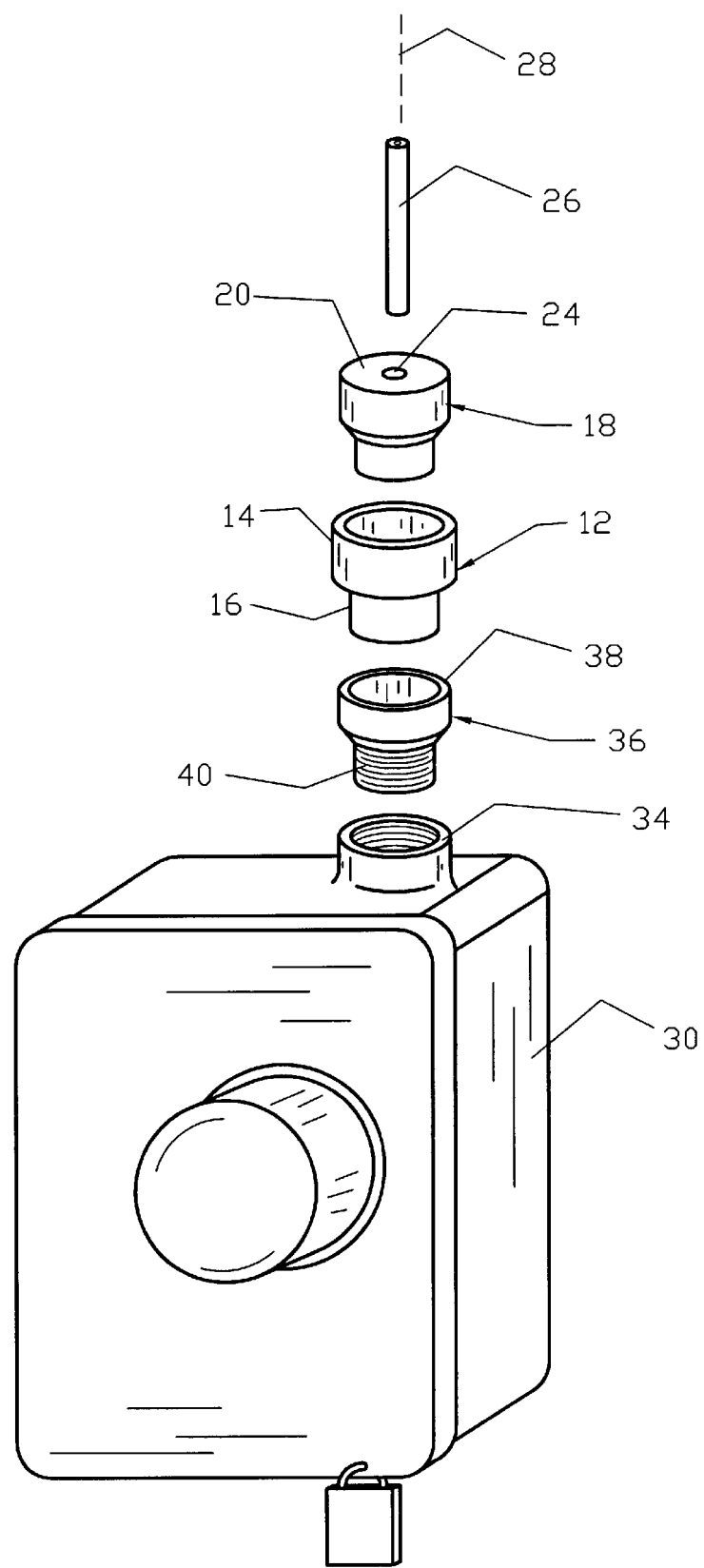
FIG. 3 is an exploded view of the system for aligning a hub/mast with a soffit penetration point.
Figure 4:
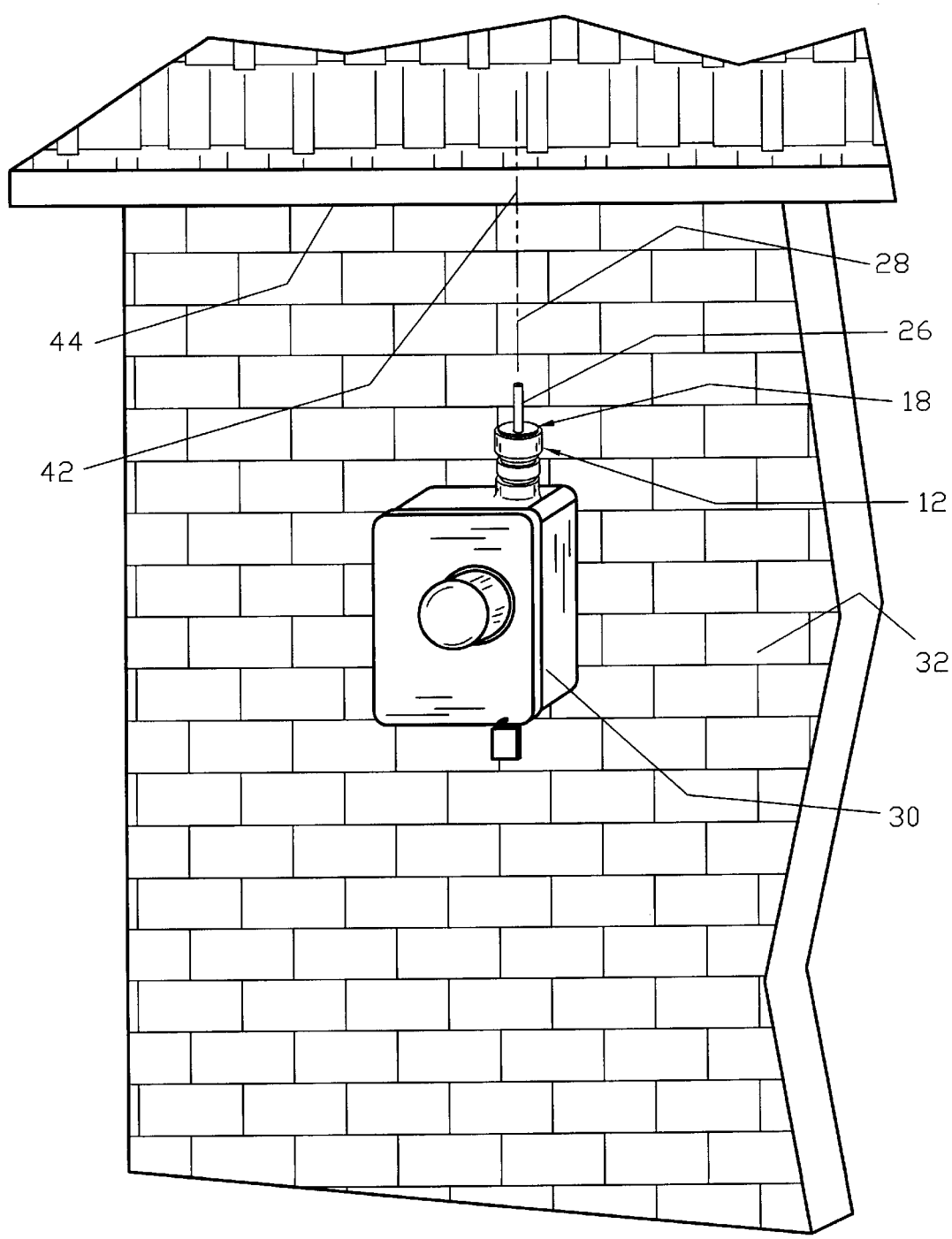
FIG. 4 is an environmental view of the system for aligning a hub/mast with a soffit penetration point.

Referring now to the drawings, it is seen that the system for aligning a hub/mast with a soffit penetration point and method of using same of the present invention, generally denoted by reference numeral 10, is comprised of an insert 12 which is a generally cylindrical body member that has an upper section 14 that has a first diameter and a lower section 16 that has a second diameter, the first diameter of the upper section 14 being greater than the second diameter of the lower section 16. A laser holder 18, having a top surface 20 and a bottom surface 22, and having an opening 24 is located within the insert 12, the opening 24 disposed along a longitudinal axis of the insert 12. The laser holder 18 may be an integral part of the insert 12 such that the laser holder 18 and the insert are one monolithic unit or the laser holder 18 may be a separate unit that is received within the upper portion 14 of the insert 12 and that substantially conforms to the shape of the inner surface of the insert 12.

A laser emitting device 26 of any appropriate design known in the art, which laser emitting device emits a laser beam 28 is receivable within the opening 24 of the laser holder 18 such that laser beam 28 emitted by the laser emitting device 26 extends upwardly from the top surface 20 of the laser holder 18 along the longitudinal axis of the insert 12.

A meter base 30 is attached to a building 32 in standard fashion. The meter base 30 has an upwardly extending opening 34 commonly referred to as a hub, which hub 34 is threaded. A terminal adapter 36 is threadably receivable within the hub 34. The terminal adapter 36 has a top section 38 that has a third diameter and a bottom section 40 that has a fourth diameter that is smaller than the third diameter of the top section 38.

In order to use the system for aligning a hub with a soffit penetration point and method of using same 10 of the present invention, the meter base 30 is attached to the building 32 in standard fashion and the bottom section 40 of the terminal adapter 36 is threadably attached to the hub 34 of the meter base 30. The longitudinal axis of the hub 34 now aligns with the desired penetration point 42 on the soffit 44 of the building 32 so that a mast can extend between the penetration point 42 and the hub 34. The insert 12 is inserted into the terminal adapter 36. The first diameter of the upper section 14 of the insert is similar to and very slightly smaller than the third diameter of the top section 38 of the terminal adapter 36 and the second diameter of the lower section 18 of the insert 12 is similar to and very slightly smaller than the fourth diameter of the bottom section 40 of the terminal adapter 36. Therefore, when the insert 12 is received within the terminal adapter 36, the insert 12 will fit very snugly within the terminal adapter 36.

At this point the laser holder 18 is snugly received within the upper section 14 of the insert 12 so that the longitudinal axis of the opening 24 of the laser holder 22 will correspond with the longitudinal axis of the terminal adapter 36. Therefore, the longitudinal axis of the insert 12 will also be aligned with the desired penetration point 42 on the soffit 44 of the building 32. The laser 26 is inserted into the opening 24 of the insert 12 (the laser 26 can also be inserted into the opening 24 prior to inserting the insert 12 into the terminal adapter 36. The laser beam 28 emitted by the laser 26, also corresponding to the longitudinal axis of the terminal adapter 36 and thus the insert 12 also points to and splashes on the desired penetration point 42 on the soffit 44 of the building 32. The electrician can now make a mark on the penetration point 42 of the soffit 44 in order to make a subsequent penetration into the soffit 44 so that a mast containing an electrical conductor (not illustrated) can pass through the penetration point 42.

Alternately, a single laser holder 18 can be provided which laser holder 18 corresponds to the smallest insert 12 that will be used on a typical job site. For example, the laser holder 18 will have an outer diameter that is 1 inch whereas the hub 34 of the meter base 30 has an inner diameter of 4 inches. Instead of providing the insert 12 that has an outer diameter of 4 inches and that has integral laser holder 18 (which has an outer diameter that corresponds to the inner diameter of the insert 12), a second insert that has an outer diameter that corresponds to the inner diameter of the first insert 12 is nested within the first insert 12. Thereafter, a third insert that has an outer diameter that corresponds to the inner diameter of the second insert is nested within the second insert and so on until the an inset has an upper section 14 that has an inner diameter that corresponds to the outer diameter of the laser holder 18 is nested within the various inserts. Once so nested, the laser holder 18 is received within the final insert 12. This allows for various sized inserts to be used with a single laser holder 22 for various sized hubs 34.

While the invention has been particularly shown and described with reference to an embodiment thereof, it will be appreciated by those skilled in the art that various changes in form and detail may be made without departing from the spirit and scope of the invention.

We claim:

1. An alignment device in combination with a meter base attached to a building having a soffit, the meter base having a hub and a terminal adapter threadably attached to the hub, the alignment device comprising:
    an insert having an upper section that has a top surface and a first diameter and a lower section that has a bottom surface and a second diameter, the first diameter being greater than the second diameter;
    an opening that extends into the insert from the top surface along a longitudinal axis of the insert;
    a laser that is receivable within the opening such that a beam emitted by the laser extends upwardly from the top surface of the insert along the longitudinal axis of the insert; and
    wherein the insert is received within the terminal adapter and the laser beam emitted by the laser illuminates a proper penetration point on the soffit of the building.

2. The alignment device as in claim 1, wherein the opening extends between the top surface and the bottom surface of the insert.

3. The alignment device as in claim 1, wherein the terminal adapter has a top section that has a third diameter and a bottom section that has a fourth diameter that is smaller than the third diameter and wherein the bottom section is threadably attached to the hub and the lower section of the insert is received within the bottom section of the terminal adapter and the upper section of the insert is received within the top section of the terminal adapter.

4. The alignment device as in claim 1 wherein the opening is disposed within a laser holder that is received within the insert.

5. A method for finding an appropriate penetration point on a soffit of a building, comprising the steps of:
    providing a meter base having a hub;
    attaching the meter base to the building;
    providing a terminal adapter having a top section that has a first diameter and a bottom section that has a second diameter that is smaller than the first diameter;
    threadably attaching the terminal adapter to the hub;
    providing an insert having an upper section that has a top surface and an third diameter and a lower section that has a bottom surface and a fourth diameter, the first diameter being greater than the second diameter and having an opening that extends into the insert from the top surface along a longitudinal axis of the insert;
    receiving the insert within the terminal adapter;
    providing a laser; and
    receiving the laser within the opening such that a beam emitted by the laser extends upwardly from the top surface of the insert along the longitudinal axis of the insert.

6. The method as in claim 5 wherein the opening extends between the top surface and the bottom surface of the insert.

7. The method as in claim 5 wherein the lower section of the insert is received within the bottom section of the terminal adapter and the upper section of the insert is received with the top section of the terminal adapter.

8. The method as in claim 5 wherein the opening is disposed within a laser holder that is received within the insert.

* * * * *